United States Patent [19]

Brunelle

[11] Patent Number: 5,229,482

[45] Date of Patent: Jul. 20, 1993

[54] PHASE TRANSFER CATALYZED PREPARATION OF AROMATIC POLYETHER POLYMERS

[75] Inventor: Daniel J. Brunelle, Scotia, N.Y.

[73] Assignee: General Electric Company, Schenectady, N.Y.

[21] Appl. No.: 661,947

[22] Filed: Feb. 28, 1991

[51] Int. Cl.$^5$ .............. C08G 8/02; C08G 14/00; C08G 75/00; C08G 65/00

[52] U.S. Cl. .................... 528/125; 528/21; 528/126; 528/128; 528/170; 528/171; 528/172; 528/173; 528/174; 528/175; 528/179; 528/182; 528/185; 528/214; 528/216; 528/219; 528/220; 546/256; 546/304

[58] Field of Search .............. 528/125, 126, 128, 21, 528/170, 171, 172, 174, 173, 175, 179, 182, 185, 214, 216, 219, 220; 546/256, 304

[56] References Cited

U.S. PATENT DOCUMENTS

| | | | |
|---|---|---|---|
| 3,787,364 | 1/1974 | Wirth et al. | 528/170 |
| 3,838,097 | 9/1974 | Wirth et al. | 528/170 |
| 3,847,869 | 11/1974 | Williams | 528/170 |
| 4,257,953 | 3/1981 | Williams | 548/461 |
| 4,273,712 | 6/1981 | Williams | 548/461 |
| 4,324,884 | 4/1982 | White | 528/207 |
| 4,324,885 | 4/1982 | White | 528/207 |
| 4,330,666 | 5/1982 | White | 528/207 |
| 4,460,778 | 7/1984 | Brunelle | 546/304 |
| 4,520,204 | 5/1985 | Evans | 548/461 |
| 4,554,357 | 11/1985 | Verbicky, Jr. | 546/272 |
| 4,577,033 | 3/1986 | Verbicky, Jr. | 546/98 |
| 4,595,760 | 6/1986 | Brunelle | 546/264 |
| 4,638,039 | 1/1987 | Percec | 525/534 |
| 4,681,949 | 7/1987 | Brunelle | 544/55 |
| 5,081,298 | 1/1992 | Brunelle | 564/236 |
| 5,082,968 | 1/1992 | Brunelle | 564/240 |
| 5,116,975 | 5/1992 | Brunelle | 544/86 |

OTHER PUBLICATIONS

CA 105(18): 153738H; "Polyarylene Polyethers".
Imai et al., *J. Poly. Sci.: Polymer Letters Ed.*, 17, 85-89 (1979).

Primary Examiner—John Kight, III
Assistant Examiner—P. Hampton-Hightower
Attorney, Agent, or Firm—William H. Pittman

[57] ABSTRACT

Aromatic polyether polymers, illustrated by polyethersulfones, polyetherketones and polyetherimides, are prepared by a phase transfer catalyzed reaction between a salt of a dihydroxyaromatic compound and a substituted aromatic compound such as bis(4-hydroxyphenyl) sulfone, bis(4-hydroxyphenyl) ketone or 1,3-bis[N-(4-chlorophthalimido)]benzene or the corresponding derivative of toluene or diphenyl ether, or the analagous fluoro-, bromo- or nitro-substituted compounds. The phase transfer catalysts employed are those which are stable at temperatures in the range of about 125°–250° C. Particularly preferred phase transfer catalysts are the hexaalkylguanidinium and α,ω-bis(pentaalkylguanidinium)alkane salts and the corresponding heterocyclic salts.

20 Claims, No Drawings

PHASE TRANSFER CATALYZED PREPARATION OF AROMATIC POLYETHER POLYMERS

This invention relates to the preparation of aromatic polyether polymers, and more particularly to their preparation by a phase transfer catalyzed reaction.

Various types of aromatic polyethers, particularly polyethersulfones and polyetherketones, have become important as engineering resins by reason of their excellent properties. These polymers are typically prepared by the reaction of salts of dihydroxyaromatic compounds, such as bisphenol A disodium salt, with dihaloaromatic molecules such as bis(4-fluorophenyl) sulfone, bis(4-chlorophenyl) sulfone or the analogous ketones.

These reactions normally require the use of dipolar aprotic solvents, which are necessary to solubilize one or both reactants. Such solvents are expensive, difficult to purify and difficult to keep dry, since they readily dissolve water. Moreover, the polymers prepared by the use of such solvents are frequently colored by reason of the occurrence of side reactions leading to colored by-products.

Another class of polymers capable of preparation by a similar method is the polyetherimides. U.S. Pat. Nos. 3,787,364, 3,838,097 and 3,847,869 describe their preparation by the reaction of salts such as bisphenol A disodium salt with halo- or nitro-substituted bis(phthalimido) derivatives of aromatic diamines. These methods of preparation also require dipolar aprotic solvents. In addition, they frequently do not afford products of high molecular weight or in high yield. As a result, polyetherimides are normally produced on a commercial scale by the reaction of diamines with bis(ether anhydrides). The latter reagents are generally themselves produced by a complex multi-step synthetic method often employing nitro-substituted phthalimides, which lead to the formation of by-products hazardous to the environment in varying degrees.

There has been considerable attention directed in recent years to methods for conducting organic reactions in heterogeneous systems, employing a phase transfer catalyst which facilitates migration of a reactant into a phase from which it is normally absent. Thus, for example, bis(ether anhydrides) may be prepared by the reaction of a bisphenol disodium salt with a nitro- or halo-substituted phthalimide in a methylene chloride-water mixture, employing a phase transfer catalyst to promote migration of the otherwise methylene chloride-insoluble bisphenol salt into the organic layer for reaction with the substituted phthalimide.

Phase transfer catalyzed reactions for the preparation of mixed alkyl aryl polyether polymers are disclosed in the literature. Similar reactions leading to fully aromatic polymers have been studied, but for the most part have been unsuccessful. This may be, at least in part, because of the instability of the catalysts at the relatively high temperatures required for polymer formation.

One successful preparation (at least on a laboratory scale) of such a polymer, disclosed in Imai et al., J. Poly. Sci., Polymer Letters Ed., 17. 85-89 (1979), is the reaction of bisphenol A dipotassium salt with bis(3-nitro-4-chlorophenyl) sulfone in a methylene chloride-water system in the presence of a phase transfer catalyst, to produce the corresponding nitro-substituted polyethersulfone. This reaction is exceptional, however, by reason of the presence of numerous highly activating nitro and sulfone groups on the aromatic rings of the sulfone.

It has now been discovered that aromatic polyether polymers may be prepared in solvents of low polarity when phase transfer catalysts are employed which are relatively stable at the high temperatures required. Said polymers are obtained in high yield and are of high molecular weight and excellent quality.

Accordingly, one aspect of the present invention is a method for preparing an aromatic polyether polymer which comprises contacting, in a solvent of low polarity and at a temperature in the range of about 125°–250° C., substantially equimolar amounts of at least one alkali metal salt of a dihydroxy-substituted aromatic hydrocarbon and at least one substituted aromatic compound of the formula

$$Z(A^1-X^1)_2, \quad (I)$$

wherein Z is an activating radical, $A^1$ is an aromatic radical and $X^1$ is fluoro, chloro, bromo or nitro, in the presence of a catalytically active amount of a phase transfer catalyst which is substantially stable at the temperatures employed.

Another aspect of the invention is compositions capable of conversion to aromatic polyether polymers upon heating at the above-defined temperatures. Said compositions comprise the above-identified solvent, bisphenol salt, substituted aromatic compound and phase transfer catalyst.

The alkali metal salts of dihydroxy-substituted aromatic hydrocarbons which are employed in the present invention are typically sodium and potassium salts. Sodium salts are frequently preferred by reason of their availability and relatively low cost.

Suitable dihydroxy-substituted aromatic hydrocarbons include those having the formula

$$HO-A^2-OH, \quad (II)$$

wherein $A^2$ is a divalent aromatic hydrocarbon radical. Suitable $A^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^2$ radical preferably has the formula

$$-A^3-Y-A^4- \quad (III)$$

wherein each of $A^3$ and $A^4$ is a monocyclic divalent aromatic hydrocarbon radical and Y is a bridging hydrocarbon radical in which one or two atoms separate $A^3$ from $A^4$ The free valence bonds in formula III are usually in the meta or para positions of $A^3$ and $A^4$ in relation to Y. Compounds in which $A^2$ has formula II are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula III, the $A^3$ and $A^4$ values may be unsubstituted phenylene or hydrocarbon-substituted derivatives thereof, illustrative substituents (one or more) being alkyl and alkenyl. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. Illustrative radicals of this type are methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred radical of formula III is the 2,2-bis(4-phenylene)propane radical, which is derived from bisphenol A and in which Y is isopropylidene and $A^3$ and $A^4$ are each p-phenylene.

Spiro(bis)indane bisphenols may also be employed. They include 6,6'-dihydroxy-3,3,3',3'-tetramethylspiro(bis)indane and its substituted analogs.

The substituted aromatic compounds of formula I which are employed in the present invention contain an aromatic radical $A^1$ and an activating radical Z. The $A^1$ radical is normally a di- or polyvalent $C_{6-10}$ radical, preferably monocyclic and preferably free from electron-withdrawing substituents other than Z. Unsubstituted $C_6$ aromatic radicals are especially preferred.

The Z radical is usually an electron-withdrawing group, which may be di- or polyvalent to correspond with the valence of $A^1$. Examples of divalent radicals are carbonyl, carbonylbis(arylene), sulfone, bis(arylene) sulfone, benzo-1,2-diazine and azoxy. Thus, the moiety —$A^1$—Z—$A^1$— may be a bis(arylene) sulfone, bis(arylene) ketone, bis(arylene)benzo-1,2-diazine or bis(arylene)azoxy radical and especially one in which $A^1$ is p-phenylene.

Also included are compounds in which —$A^1$—Z—$A^1$— is a bis(ether imide) radical, illustrated by those of the formula

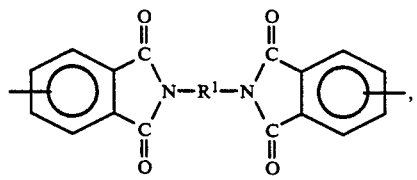

(IV)

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

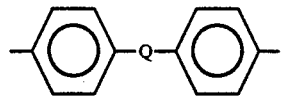

(V)

in which Q is

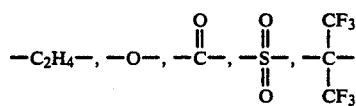

or a covalent bond. Most often, $R^1$ is at least one of m-phenylene, p-phenylene, 4,4'-oxybis(phenylene) and

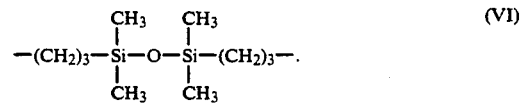

(VI)

Polyvalent Z radicals include those which, with $A^1$, form part of a fused ring system such as benzimidazole, benzoxazole, quinoxaline or benzofuran.

Also present in the substituted aromatic compound of formula I are two displaceable $X^1$ radicals which may be fluoro, chloro, bromo or nitro. In most instances, fluoro and chloro atoms are preferred by reason of the relative availability and effectiveness of the compounds containing them.

Among the particularly preferred substituted aromatic compounds of formula I are bis(4-fluorophenyl) sulfone and the corresponding chloro compound, bis(4-fluorophenyl) ketone and the corresponding chloro compound, and 1,3- and 1,4-bis[N-(4-fluorophthalimido)]benzene and 4,4'-bis[N-(4-fluorophthalimido)]phenyl ether and the corresponding chloro, bromo and nitro compounds.

A third material employed according to the present invention is a solvent of low polarity, usually substantially lower than that of the dipolar aprotic solvents previously employed for the preparation of aromatic polyether polymers. Said solvent preferably has a boiling point above about 150° C., in order to facilitate the reaction which requires temperatures in the range of about 125°–250° C. Suitable solvents of this type include o-dichlorobenzene, dichlorotoluene, 1,2,4-trichlorobenzene and diphenyl sulfone. Solvents of similar polarity but lower boiling points, such as chlorobenzene, may be employed at superatmospheric pressures.

An essential feature of the invention is the presence of a phase transfer catalyst which is substantially stable at temperatures in the range of about 125°–250° C. Various types of phase transfer catalysts may be employed for this purpose. They include quaternary phosphonium salts of the type disclosed in U.S Pat. No. 4,273,712, N-alkyl-4-dialkylaminopyridinium salts of the type disclosed in U.S. Pat. Nos. 4,460,778 and 4,595,760, and guanidinium salts of the type disclosed in copeinidng commonly owned application Ser. No. 07/626,150,filed Dec. 10, 1990 now abaondoned. Said patents and application are incorporated by reference herein.

The preferred phase transfer catalysts, by reason of their exceptional stability at high temperatures and their effectiveness to produce high molecular weight aromatic polyether polymers in high yield are the hexaalkylguanidinium and α,ω-bis(pentaalkylguanidinium)alkane salts. For the sake of brevity, both types of salts are hereinafter sometimes designated "guanidinium salt".

Suitable guanidinium salts are represented by the formula

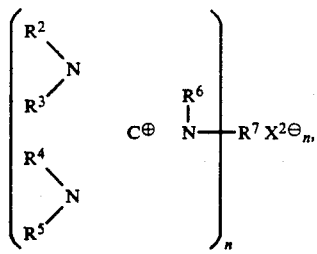

wherein:

each of $R^2$, $R^3$, $R^4$, $R^5$ and $R^6$ is a primary alkyl radical and $R^7$ is a primary alkyl or bis(primary alkylene) radical, or at least one of the $R^2$—$R^3$, $R^4$—$R^5$ and $R^6$—$R^7$ combinations with the connecting nitrogen atom forms a heterocyclic radical;

$X^2$ is an anion; and n is 1 or 2.

The alkyl radicals suitable as $R^{2-6}$ include primary alkyl radicals, generally containing about 1–12 carbon atoms. $R^7$ is usually an alkyl radical of the same structure or a $C_{2-12}$ alkylene radical in which the terminal carbons are primary; most preferably, it is $C_{2-6}$ alkyl or $C_{4-8}$ straight chain alkylene. Alternatively, any combination of $R^{2-7}$ and the corresponding nitrogen atom(s) may form a heterocyclic radical such as piperidino, pyrrolo or morpholino.

The $\alpha,\omega$-bis(pentaalkylguanidinium)alkane salts when $R^7$ is alkylene and n is 2 are disclosed and claimed in copending, commonly owned application Ser. No. 07/626,147 filed Dec. 12, 1990 now U.S. Pat. No. 5,081,298.

The $X^2$ value may be any anion and is preferably an anion of a strong acid; examples are chloride, bromide and methanesulfonate. Chloride and bromide ions are usually preferred. The value of n will be 1 or 2 depending on whether $R^7$ is alkyl or alkylene.

As indicated by the dotted bonds in formula VI, the positive charge in the guanidinium salt is delocalized over one carbon and three nitrogen atoms. This is believed to contribute to the salts' stability under the relatively high temperature conditions encountered according to the invention. As a result, decomposition of the guanidinium salt does not occur or occurs only to a very minor extent. The results include suppression of by-product formation and potential for continued use via recycle.

Hexaalkylguanidinium salts may be prepared by the reaction of a corresponding urea (e.g., a tetraalkylurea) with phosgene or phosphorus oxychloride, or by the reaction of a similar thiourea with an N,N-dialkylcarbamoyl halide, to yield a chloroformamidinium salt, frequently referred to as a "Vilsmeier salt", followed by reaction of said salt with a corresponding amine (e.g., a dialkylamine). Reference is made to Kantlehner et al., *Liebigs Ann. Chem.*, 1984, 108–126, and Pruszynski, *Can. J. Chem.*, 626–629 (1987), which are incorporated by reference herein. $\alpha,\omega$-Bis(pentaalkylguanidinium)alkane salts may be similarly prepared by reaction of the chloroformamidinium salt with a monoalkylamine, followed by reaction of the resulting pentaalkylguanidinium salt with an alkylene dihalide.

The preparation of guanidinium salts is illustrated by the following examples.

EXAMPLE 1

A 3-liter, 5-necked flask fitted with a mechanical stirrer, condenser, phosgene inlet tube, pH meter and addition port was charged with 182.85 grams (2.5 moles) of diethylamine, one liter of methylene chloride and 200 ml. of water. Phosgene (99 grams, 1 mole) was passed into the mixture under nitrogen, with stirring, at the rate of 3 grams per minute, with addition of aqueous sodium hydroxide solution to maintain the pH in the range of 10–12. A vigorous exothermic reaction took place during phosgene addition, causing refluxing of the methylene chloride. After phosgene addition was complete, the mixture was maintained at a pH of 12 while refluxing was continued for 2 hours. The methylene chloride phase was separated, washed with water and vacuum stripped to yield the desired crude tetraethylurea in quantitative yield based on phosgene.

To a solution of 172.3 grams (1 mole) of tetraethylurea in 100 ml. of dry toluene was added under nitrogen, with stirring, 170 grams (1.05 moles) of phosphorus oxychloride. The mixture was stirred and warmed at 60° C. for 2 hours under nitrogen, whereupon the Vilsmeier salt separated as a second phase. Periodic analysis by nuclear magnetic resonance indicated when the reaction was complete. At that point, the mixture was cooled to 0° C. and diluted with 500 ml. of dry methylene chloride. There was then added, under nitrogen, 182 grams (2.5 moles) of diethylamine, with stirring at 0° C. An exothermic reaction took place, and when it was complete the mixture was warmed to room temperature and analyzed by proton nuclear magnetic resonance. Additional diethylamine was added until no further Vilsmeier salt was present in the mixture, after which 400 ml. of 35% aqueous sodium hydroxide was added carefully and the mixture was extracted with methylene chloride. The organic phase was washed with saturated sodium chloride solution, dried and evaporated to afford the crude product as a yellow oil which crystallized upon addition of ethyl acetate. Upon filtration of the ethyl acetate slurry, the desired hexaethylguanidinium chloride was obtained in 87% yield. It could be recrystallized from a mixture of equal volumes of heptane and ethyl acetate, with enough chloroform added to effect solution when hot.

EXAMPLE 2

Hexaethylguanidinium chloride, obtained according to Example 1, was dissolved in methylene chloride and the solution was washed three times with saturated aqueous sodium bromide solution. Upon workup as described in Example 1, the desired hexaethylguanidinium bromide was obtained; it had a melting point of 174°–175° C.

EXAMPLE 3

The procedure of Examples 1–2 was repeated, substituting tetra-n-butylurea and di-n-butylamine for the tetraethylurea and diethylamine, respectively. The product was the desired hexa-n-butylguanidinium bromide.

EXAMPLE 4

A mixture of 56.9 grams (200 mmol.) of tetra-n-butylurea, 32.2 grams (210 mmol.) of phosphorus oxychloride and 75 ml. of acetonitrile was heated at 75° C. in a nitrogen atmosphere for one hour. The mixture was then cooled to 0° C. and 33.6 grams (460 mmol.) of n-butylamine was added over 15 minutes with stirring, whereupon a soft, fluffy precipitate formed. The mixture was warmed to 60° C. for one hour and again cooled to 0° C., quenched with 50 ml. of 25% (by weight) aqueous sodium hydroxide solution and extracted with ether. The ether extracts were dried over magnesium sulfate, filtered and stripped to give a pale yellow oil which, upon distillation, yielded 56.32 grams (83% of theoretical) of penta-n-butylguanidine.

A mixture of 16.98 grams (50 mmol) of penta-n-butylguanidine, 6.0995 grams (25 mmol.) of 1,6-dibromohexane and 50 ml. of acetonitrile was heated under reflux in a nitrogen atmosphere for 16 hours, after which proton nuclear magnetic spectroscopy showed the absence of carbon-bromine absorption. Upon vacuum stripping, a pale yellow oil was obtained which crystallized to a white solid upon standing. Upon recrystallization from a mixture of hexane and ethyl acetate, the desired 1,6-bis(N,N',N',N'',N''-penta-n-butylguanidinium)hexane dibromide, which melted at 100°-102° C.; its structure was confirmed by proton and carbon-13 nuclear magnetic resonance and Fourier transform infrared spectroscopy.

EXAMPLE 5

The procedure of Example 4 was repeated, substituting tetraethylurea on an equimolar basis for the tetra-n-butylurea and employing a mixture of 25 mmol. each of n-butylamine and triethylamine, the latter serving as a hydrogen chloride acceptor. The product was the desired 1,6-bis(N-n-butyl-N', N',N'',N''-tetraethylguanidinium)hexane dibromide.

According to the present invention, the bisphenol salt and substituted aromatic compound are brought into contact in substantially equimolar amounts. For maximum molecular weight, the amounts should be as close as possible to exactly equimolar, but molecular weight control may be achieved by employing one reagent or the other in slight excess. It is also within the scope of the invention to employ monofunctional reagents such as monohydroxyaromatic compounds or monohalo- or nitroaromatic compounds as chain termination agents.

Reaction temperatures are in the range of about 125°-250° C., preferably about 130°-225° C. The proportion of phase transfer catalyst employed is generally about 0.5-10 and preferably about 1-5 mole percent based on bisphenol salt.

Following completion of the reaction, the aromatic polyether polymer may be isolated by conventional methods. This typically includes the steps of washing and precipitation by combination of the polymer solution with a non-solvent for the polymer.

The invention is illustrated by the following examples, in which phase transfer catalysts are designated as follows:
BPBr—tetra-n-butylphosphonium bromide.
DBAPCl—N-2-ethylhexyl-4-dibutylaminopyridinium chloride.
EGBr—hexaethylguanidinium bromide.
PipGBr—tris(piperidino)guanidinium bromide.
PBGBr—1,6-bis(N-N',N',N'',N''-penta-n-butylguanidinium)hexane dibromide.

EXAMPLE 6

Bisphenol A disodium salt was prepared by the reaction of bisphenol A with a stoichiometric amount of aqueous sodium hydroxide solution in xylene, followed by azeotropic removal of water and vacuum drying at 100° C. A 50-ml. round-bottomed flask was oven dried, weighed, cooled under nitrogen and charged with approximately 2.72 grams (10 mmol.) of the disodium salt, and was then accurately reweighed to determine the exact amount of salt charged. The flask was purged with argon and a precisely equimolar amount of bis(4-chlorophenyl) sulfone and 21 ml. of o-dichlorobenzene were added. The mixture was stirred and 1 ml. of solvent was distilled off to ensure removal of water, and 185 mg. (0.2 mmol.) of PBGBr was added. The reaction mixture was heated under reflux, with stirring, with samples being periodically removed, quenched with acetic acid, dissolved in chloroform, washed with water, filtered and analyzed for polymer molecular weight.

At the end of the reaction period, the mixture was cooled to about 50° C., quenched with acetic acid, diluted with 25 ml. of methylene chloride and washed with water. The polyethersulfone was precipitated by pouring the solution into methanol and was filtered and washed with further methanol. It was isolated as a white powder from which a clear, tough, colorless film was cast from chloroform.

EXAMPLES 7-24

The procedure of Example 6 was repeated, employing various substituted aromatic compounds and phase transfer catalysts.

The results of Examples 6-24 are summarized in the following table. Molecular weights were determined by gel permeation chromatography relative to polystyrene.

| Example | Substituted arom. compound | Phase transfer cat. Identity | Mole % | Time | Mw |
|---|---|---|---|---|---|
| 6 | Bis(4-chlorophenyl)sulfone | PBGBr | 2 | 15 min. | 51,200 |
|   |   |   |   | 2 hrs. | 60,700 |
| 7 | " | EGBr | 2 | 5 hrs. | 40,600 |
| 8 | " | BPBr | 5 | 30 min. | 13,000 |
|   |   |   |   | 5 hrs. | 28,000 |
| 9 | Bis(4-fluorophenyl)sulfone | BPBr | 2 | 3 hrs. | 14,300 |
|   |   |   |   | 5 hrs. | 48,900 |
| 10 | " | DBAPCl | 2 | 1.5 hrs. | 79,500 |
|   |   |   |   | 3 hrs. | 110,100 |
| 11 | " | EGBr | 5 | 1 hr. | 17,800 |
|   |   |   |   | 2 hrs. | 19,100 |
|   |   |   |   | 8 hrs. | 56,500 |
| 12 | " | PBGBr | 5 | 2 hrs. | 61,000 |
| 13 | Bis(4-fluorophenyl)ketone | EGBr | 5 | 4 hrs. | 23,200 |
| 14 | " | PBGBr | 2 | 5 hrs. | 32,100 |
|   |   |   |   | 20 hrs. | 99,500 |
| 15 | Bis(4-chlorophenyl)sulfone | PBGBr | 2 | 15 min. |   |

-continued

| Example | Substituted arom. compound | Phase transfer cat. Identity | Mole % | Time | Mw |
|---|---|---|---|---|---|
| 16 | 1,3-Bis[N-(4-chlorophthalimido)]benzene | PipGBr | 2 | 2 hrs. | 16,200 |
|  |  |  |  | 20 min. | 23,600 |
| 17 | " | PBGBr | 2 | 1 hr. | 64,600 |
|  |  |  |  | 20 min. | 43,000 |
|  |  |  |  | 2 hrs. | 82,900 |
| 18 | 1,3-Bis[N-(4-chlorophthalimido)]toluene | BPBr | 2 | 1 hr. | 6,700 |
| 19 | " | DBAPCl | 2 | 1 hr. | 12,600 |
| 20 | " | EGBr | 2 | 20 min. | 64,000 |
|  |  |  |  | 1 hr. | 153,600 |
| 21 | " | PBGBr | 2 | 20 min. | 161,300 |
|  |  |  |  | 1 hr. | 226,200 |
| 22 | " | PipGBr | 2 | 20 min. | 73,700 |
|  |  |  |  | 1 hr. | 136,500 |
| 23 | 1,3-Bis[N-(4-fluorophthalimido)]benzene | EGBr2 | 2 | 10 min. | 63,000 |
|  |  |  |  | 20 min. | 103,200 |
| 24 | 4,4'-Bis[N-(4-nitrophthalimido)]phenyl ether | PBGBr2 |  | 15 min. | 117,000 |

EXAMPLE 25

The reactants and procedue of Example 17 were empolyed, except that the 1,3-bis[N-(4-chlorophthalimido)]benzene was present in 1% molar excess. The molecular weight of the product was 64,500 after 20 minutes.

What is claimed is:

1. A method for preparing an aromatic polyether polymer which comprises contacting, in a solvent having a polarity no higher than that of o-dichlorobenzene, 1,24-trichlorobenzene and diphenyl sulfone and at a temperature in the range of about 125°–250° C., substantially equimolar amounts of at least one alkali metal salt of a dihydroxy-substituted aromatic hydrocarbon and at least one substituted aromatic compound of the formula $$Z(A^1-X^1)_2, \quad (I)$$

wherein Z is an activating radical, $A^1$ is an aromatic radical and $X^1$ is fluoro, chloro, bromo or nitro, in the presence of a catalytically active amount of a phase transfer catalyst which is substantially stable at the temperatures employed.

2. A method according to claim 1 wherein the solvent is o-dichlorobenzene, 1,2,4-trichlorobenzene or diphenyl sulfone.

3. A method according to claim 2 wherein the phase transfer catalyst is a quaternary phosphonium salt, an alkylaminopyridinium salt or a guanidinium salt of the formula

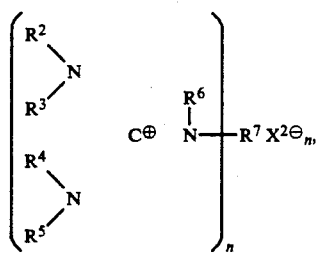

(VII)

wherein:
each of $R^2$, $R^3$, $R^4$, $R^5$ and $R^6$ is a primary alkyl radical and $R^7$ is a primary alkyl or bis(primary alkylene) radical, or at least one of the $R^2$—$R^3$, $R^4$—$R^5$ and $R^6$—$R^7$ combinations with the connecting nitrogen atom forms a heterocyclic radical;

$X^2$ is an anion; and
n is 1 or 2.

4. A method according to claim 3 wherein $A^1$ is a di- or polyvalent monocyclic C6-10 radical free from electron-withdrawing substituents other than Z.

5. A method according to claim 4 wherein the dihydroxy-substituted aromatic hydrocarbon has the formula HO—$A^3$—Y—$A^4$—OH, wherein each of $A^3$ and $A^4$ is a monocyclic divalent aromatic hydrocarbon radical and Y is a bridging hydrocarbon radical in which one or two atoms separate $A^3$ from $A^4$.

6. A method according to claim 5 wherein $A^1$ is p-phenylene.

7. A method according to claim 6 wherein Z is a sulfone radical.

8. A method according to claim 6 wherein Z is a carbonyl radical.

9. A method according to claim 5 wherein —$A^1$—Z—$A^1$— is a bis(ether imide) radical of the formula

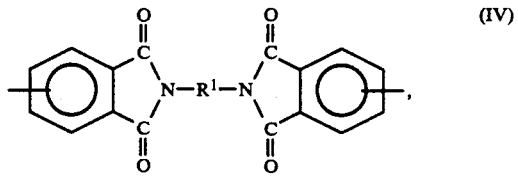

(IV)

wherein $R^1$ is a C6-20 divalent aromatic hydrocarbon or halogenated hydrocarbon radical, a C2-20 alkylene or cycloalkylene radical, a C2-8 bis(alkylene-terminated) polydiorganosiloxane radical or a divalent radical of the formula

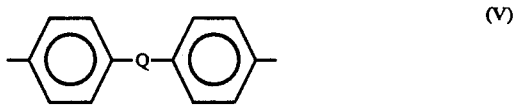

(V)

in which Q is

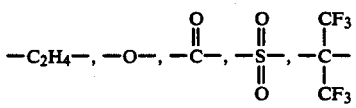

or a covalent bond.

10. A method according to claim 5 wherein $X^1$ is fluoro or chloro.

11. A method according to claim 5 wherein the dihydroxy-substituted aromatic hydrocarbon is bisphenol A.

12. A method according to claim 11 wherein the solvent is o-dichlorobenzene.

13. A method according to claim 12 wherein the reaction temperature is in the range of about 130°–225° C.

14. A method according to claim 5 wherein the phase transfer catalyst is a quaternary phosphonium salt.

15. A method according to claim 5 wherein the phase transfer catalyst is an N-alkyl-4-dialkylaminopyridinium salt.

16. A method according to claim 5 wherein the phase transfer catalyst is a guanidinium salt of formula VII.

17. A method according to claim 16 wherein the proportion of phase transfer catalyst employed is about 1–5 mole percent based on the dihydroxy-substituted aromatic hydrocarbon salt.

18. A method according to claim 17 wherein the guanidinium salt is hexaethylguanidinium chloride.

19. A method according to claim 17 wherein the guanidinium salt is hexaethylguanidinium bromide.

20. A method according to claim 17 wherein the guanidinium salt is 1,6-bis(penta-n-butylguanidinium)-hexane dibromide.

* * * * *

UNITED STATES PATENT AND TRADEMARK OFFICE
CERTIFICATE OF CORRECTION

PATENT NO. : 5,229,482
DATED : July 20, 1993
INVENTOR(S) : Daniel J. Brunelle

It is certified that error appears in the above-indentified patent and that said Letters Patent is hereby corrected as shown below:

Column 5, lines 1-10, the formula should read:

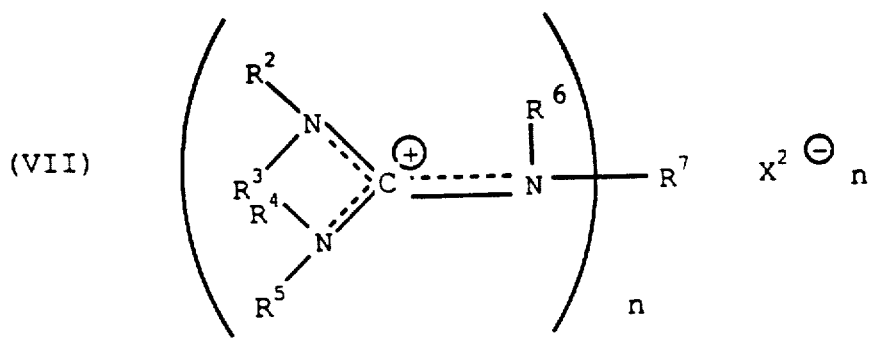

Signed and Sealed this

Tenth Day of May, 1994

*Attest:*

BRUCE LEHMAN

*Attesting Officer*   Commissioner of Patents and Trademarks